No. 851,199. PATENTED APR. 23, 1907.
E. DOYLE.
RUTTER FOR LOGGING SLEDS.
APPLICATION FILED JUNE 27, 1906.

2 SHEETS—SHEET 1.

Witnesses
C. R. Thomas
H. C. MacCaffrey

Inventor
E. Doyle
By Chandler & Chandler
Attorneys

THE NORRIS PETERS CO., WASHINGTON, D. C.

No. 851,199. PATENTED APR. 23, 1907.
E. DOYLE.
RUTTER FOR LOGGING SLEDS.
APPLICATION FILED JUNE 27, 1906.
2 SHEETS—SHEET 2.
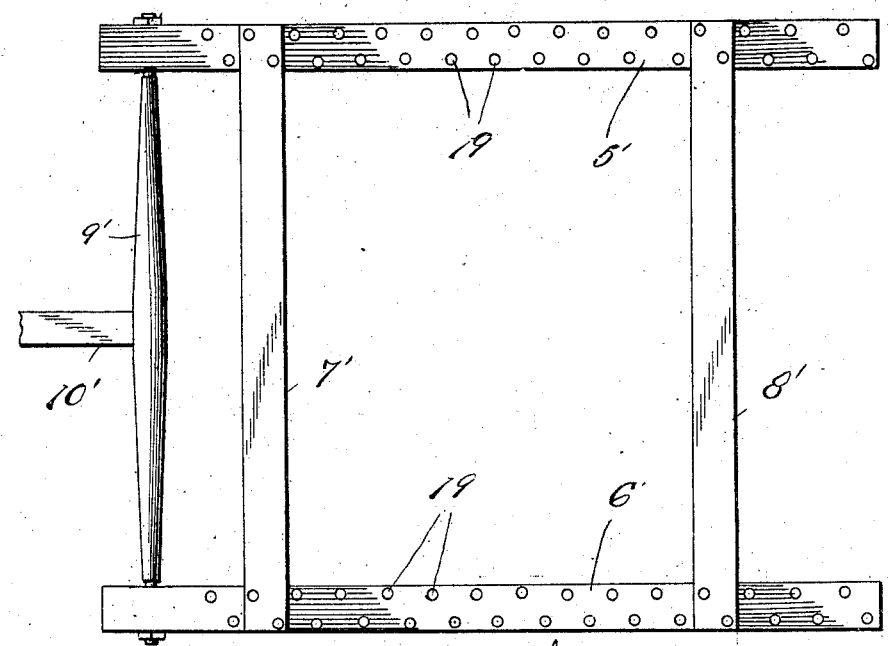
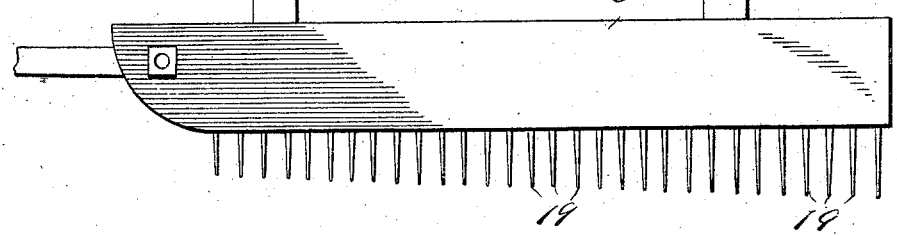
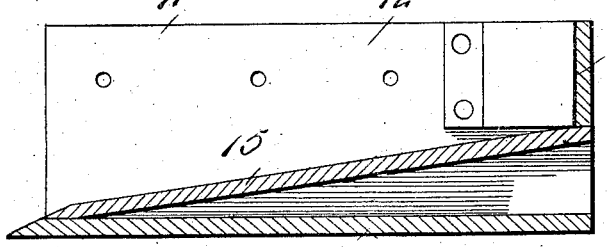
Witnesses
G. R. Thomas.
H. C. MacPartny
Inventor
E. Doyle
By Chandler & Chandler
Attorneys

UNITED STATES PATENT OFFICE.

EDWARD DOYLE, OF BOYD, WISCONSIN.

RUTTER FOR LOGGING-SLEDS.

No. 851,199.  Specification of Letters Patent.  Patented April 23, 1907.

Application filed June 27, 1906. Serial No. 323,653.

*To all whom it may concern:*

Be it known that I, EDWARD DOYLE, a citizen of the United States, residing at Boyd, in the county of Chippewa, State of Wisconsin, have invented certain new and useful Improvements in Rutters for Logging-Sleds; and I do hereby declare the following to be a full, clear, and exact description of the invention, such as will enable others skilled in the art to which it appertains to make and use the same.

This invention has reference to logging sled rutters, its object being to construct a device of that nature, which may be attached to the runners of a logging sled to remove the dirt, snow, or ice, with which the sled ruts frequently become filled.

As is generally known, cut logs are transported to the saw mill or, as the case may be, the river or stream where they are formed into rafts, by means of sleds which travel in ruts cut or otherwise formed in the hillside; such ruts during the winter season become filled with snow, ice, or dirt, thus preventing the logging sleds from traveling therein.

It is the object of this invention, therefore, to construct a device which may be attached to the runners of the sled to completely clear the ruts, it being understood that the ice or packed snow or dirt therein is first broken up.

Figure 1:
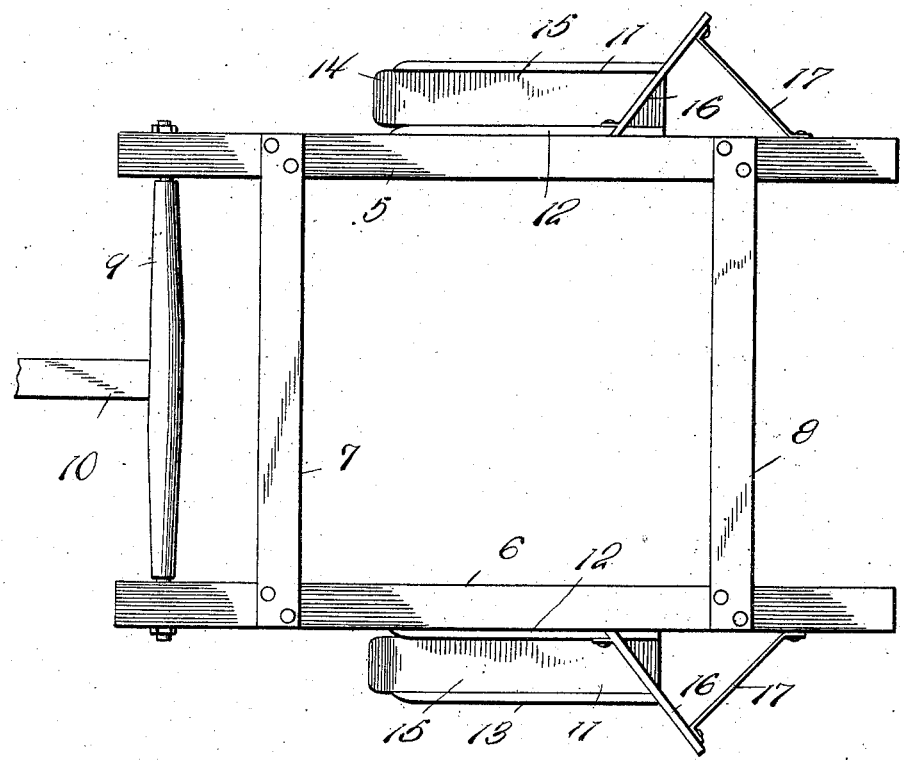
Figure 2:
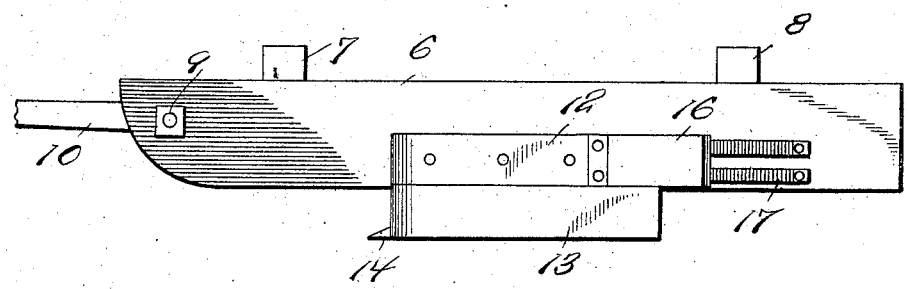

The invention will be readily understood from the following detailed description, taken in consideration with the accompanying drawings, in which:

Figure 1 is a top plan view of a logging sled provided with the improved rutter. Fig. 2 is a side elevation of the same. Fig. 3 is a top plan view of the sled provided with the drag-teeth for chopping up or breaking the ice, or packed snow in the ruts. Fig. 4 is a side elevation of Fig. 3. Fig. 5 is an enlarged longitudinal section taken through one of the rutting devices.

Like parts are designated by corresponding reference numerals in the several views.

Referring to the drawings, there is shown a logging sled of the usual type, comprising side sills or runners 5 and 6, connected by cross-beams 7 and 8, mounted upon the upper face of said runners. The front end of the sled is provided with the axle 9, secured between the runners and having connected thereto the tongue or pole 10.

Attached to the outer face of each runner is the rutting device, generally designated 11, each device consisting of a pair of parallel vertically-arranged cutters 12 and 13, the inner cutter 12 being approximately twice the height of the outer cutter 13, and secured to the corresponding sled runner by bolts, or other preferred means. Secured between the inner and outer cutters of each rutter is a bottom cutter 14, having its forward end projecting beyond the forward edges of the vertical cutters, as shown. Each rutter likewise carries an inclined cutter 15, likewise secured between the vertical cutters, the plane of said inclined cutter being approximately at right-angles to that of the vertical cutters. The rear edge of each inner cutter is slightly cut away to form a shoulder, and each outer cutter and inclined cutter extend a slight distance to the rear of the inner cutter, thus forming a support upon which is mounted a mold plate 16, secured by bolts to the corresponding inner and inclined cutters, and braced with respect to the corresponding sled runner, as shown at 17.

The arrangement of the several parts of each rutter is such that they form an inclosed trough, the upper wall of which is inclined toward the bottom wall and meets the same.

Each rutter as a whole is oppositely disposed with respect to the other rutter, the mold plate of each rutter extending in a direction opposite to that of the other mold plate, and projecting beyond the corresponding outer cutter.

In Figs. 3 and 4 there is shown a sled having drag-teeth 19 attached to each runner for the purpose of breaking up or chopping the ice or packed snow or dirt filling the ruts. The width of this sled in practice is about equal to the width of the complete rutting sled (i. e. with the rutters attached) or, in other words, to the distance between the ruts. The remaining parts of the sled shown in Figs. 3 and 4 are identical with those shown in Figs. 1 and 2, further description thereof being therefore unnecessary, the corresponding parts in Figs. 3 and 4 being designated by like primed reference numerals.

It is to be understood that the sled shown in Figs. 3 and 4 is used only where the ice or snow is too densely packed in the ruts to be removed by the rutters shown on the sled illustrated in Figs. 1 and 2. In this event, the toothed sled is first dragged through the ruts, when the teeth will break up the filling therein; the rutting sled proper is then dragged down the hillside, and the cutters carried thereby will remove the ice, etc. in the ruts broken up by the toothed sled, as above described. Where, however, the filling of dirt or snow in the ruts is somewhat loose, or the ice layer is thin, the rutting sled proper may be used in the first instance and the filling removed.

Owing to the angular disposition of the mold plates, with respect to the cutters, and to the inclination of the intermediate cutters 15, the ice, etc., filling the ruts will pass along up the inclined cutter, and on striking the mold plates, will be thrown off tangentially at opposite sides of the sled, as will be readily understood.

Modifications and changes may obviously be made in the size, and material of the various parts, and in minor details of construction, generally, and it is therefore not intended that the invention be limited to the exact details shown and described.

What is claimed, is:—

1. A device of the class described, comprising a sled; and a rutter secured to the outer face of each sled runner, each rutter comprising separate inner and outer vertically arranged cutters, a bottom cutter, and an inclined transverse cutter mounted between said vertical cutters, directly above said bottom cutter, the several cutters having their forward edges beveled to form cutting edges.

2. A device of the kind described, comprising in combination with a sled, a rutter secured to the outer face of each sled runner, each rutter comprising independent inner and outer parallel cutters arranged in spaced relation to each other, a bottom cutter, an inclined transverse cutter secured between said inner and outer cutters, and directly above said bottom cutter, and a mold plate secured to the rear edges of said inner and inclined cutters and projecting beyond said outer cutter, at an angle to the plane thereof, the several cutters having their forward edges beveled to form cutting edges.

3. A rutter for logging sleds comprising, in combination, an inner and an outer vertical cutter arranged in spaced relation to and independent of each other, the inner cutter being of greater height than the outer cutter; a bottom cutter secured between said vertical cutters; an inclined cutter mounted between said vertical cutters directly above said bottom cutter; and a separate, laterally disposed mold plate secured to the rear edges of the inner and inclined cutters and projecting beyond said outer cutter, the several cutters having their forward edges beveled to form cutting edges.

In testimony whereof, I affix my signature, in presence of two witnesses.

ED. DOYLE.

Witnesses:
 G. C. KUHN,
 THEO. BUTSCHER.